United States Patent [19]

Krude

[11] 4,078,400
[45] Mar. 14, 1978

[54] CONSTANT VELOCITY UNIVERSAL JOINT

[75] Inventor: Werner Krude, Neunkirchen, Germany

[73] Assignee: Uni-Cardan AG, Lohmar, Germany

[21] Appl. No.: 681,753

[22] Filed: Apr. 29, 1976

[30] Foreign Application Priority Data

Apr. 29, 1975 Germany .............................. 2518956

[51] Int. Cl.² .............................................. F16D 3/30
[52] U.S. Cl. ............................................ 64/21; 64/7; 64/8
[58] Field of Search .................................. 64/21, 8, 7

[56] References Cited

U.S. PATENT DOCUMENTS

| | | | |
|---|---|---|---|
| 3,133,431 | 5/1964 | Zech | 64/21 |
| 3,592,023 | 7/1971 | Okoshi | 64/21 |
| 3,613,397 | 10/1971 | Okoski | 64/21 |
| 3,908,400 | 9/1975 | Takahashi | 64/21 |
| 3,919,861 | 11/1975 | Bellomo | 64/21 |

Primary Examiner—Benjamin W. Wyche
Assistant Examiner—R. C. Turner
Attorney, Agent, or Firm—Edmund M. Jaskiewicz

[57] ABSTRACT

A constant velocity universal joint comprises an outer joint element having a spherical cavity therein and an inner joint element positioned within the spherical cavity. A plurality of torque transmitting balls are positioned within pairs of opposed grooves formed in the opposing spherical surfaces of the inner and outer joint elements. Ball retaining means are disposed between the joint elements. The ball retaining means has an inner spherical surface co-acting with the outer spherical surface of the inner joint member and an outer spherical surface co-acting with the spherical surface of the cavity of the outer joint element. The number of grooves in each joint element is divisible by two but is at least four and the center line of each groove lies in a plane spaced from the axis of rotation of the joint element and parallel thereto.

6 Claims, 6 Drawing Figures

CONSTANT VELOCITY UNIVERSAL JOINT

The present invention relates to a constant velocity universal joint, more particularly, to the groove structure in the inner and outer joint elements within which are positioned the torque transmitting balls.

One structure of a constant velocity universal joint comprises an outer joint element having a cavity or recess therein the wall of which has a plurality of axially extending grooves. An inner joint element is disposed in the cavity of the outer joint element and has in its outer surface a number of grooves corresponding to the number of grooves in the outer joint element to define pairs of grooves and a torque transmitting ball being jointly received in each pair of grooves. The balls are guided by a ball retaining structure positioned between the inner and outer joint elements and the centers of the balls are located in a plane which bisects the angle between the axes of the inner and outer joint members. The ball retaining means has an inner concave surface which is guided on the spherical outer surface of the inner joint element and the outer spherical surface of the ball retaining means is guided on the spherical inner surface of the cavity of the outer joint element.

A disadvantage of such a universal joint is that the manufacture of this joint requires a separate operation for each ball groove of the inner and outer joint elements since the ball grooves are in the form of tangents and comprise a sloped angle. A further disadvantage is that the joint can be assembled only if the inner joint element and the shaft are separate and consist of two components since the balls can only be inserted after a bending of the joint.

It is therefore the principal object of the present invention to provide an improved constant velocity universal joint of the type as described above having a simplified structure so that assembly of the joint is facilitated.

It is another object of the present invention to provide such a universal joint having ball grooves which can be readily and economically formed during the manufacturing operation.

It is a further object of the present invention to provide such a universal joint having novel and improved ball grooves and wherein the balls can transmit torque in both directions.

According to one object of the present invention a constant velocity universal joint has outer and inner joint elements drivingly connected by torque transmitting balls guided in a ball retaining structure disposed between the joint elements. The ball retainer has an outer spherical surface which is guided in a spherical cavity of the outer joint element and has an inner spherical surface which is guided upon an outer spherical surface of the inner joint element. The balls are retained in opposed pairs of grooves formed in the inner spherical surface of the cavity in the outer joint element and in the outer spherical surface of the inner joint element. The balls are retained in a plane which bisects the angle between the joint elements. The number of grooves in each joint element is divisible by two but is at least four. The center line of each groove lies in a plane spaced from the axis of rotation of the joint element and parallel thereto.

The structure of the universal joint disclosed herein has the advantage in that the ball grooves can be manufactured with a significant saving in time and cost and that the balls are so retained in the ball grooves as to be able to transmit torque in both directions of rotation.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment and modifications of the present invention will be described in detail.

Figure 1:
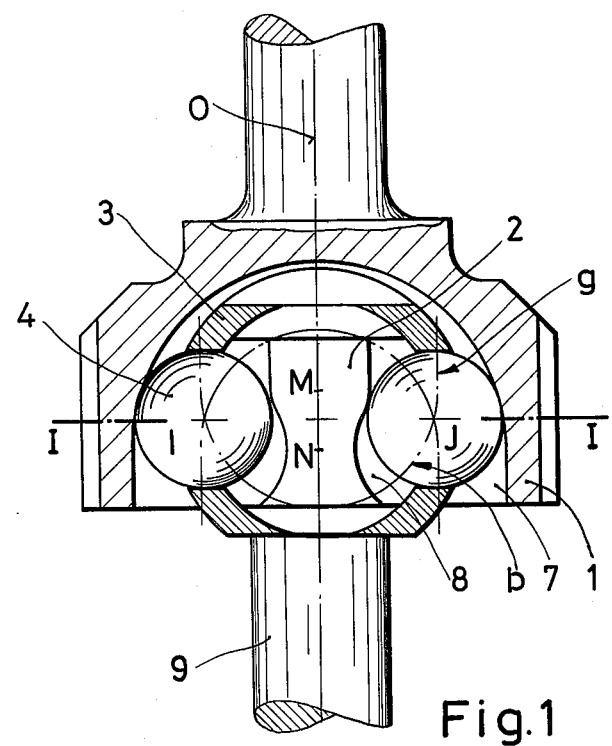
FIG. 1 is a longitudinal sectional view of a constant velocity universal joint incorporating the present invention and taken along the line III—III of FIG. 2.
Figure 2:
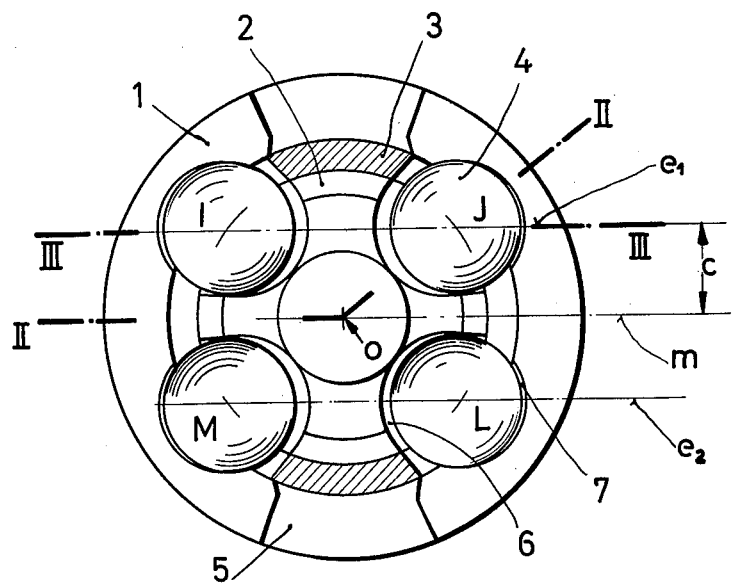
FIG. 2 is a sectional view taken along the line I—I of FIG. 1.

The constant velocity universal joint according to the present invention is shown in FIGS. 1 and 2 and comprises an outer joint element 1 having a spherical cavity or recess therein and a plurality of parallels substantially axially extending grooves 7 formed in the surface of the spherical cavity. An inner joint element 2 having outer spherical surface is positioned within the cavity of the outer joint element 1 and is similarly provided with a plurality of parallel substantially axially extending grooves in its outer spherical surface. There are the same number of grooves 7 and 8 in the inner and outer joint elements and the grooves are arranged to form pairs of opposed grooves with a plurality of torque transmitting balls 4 positioned in the opposed grooves. A ball holder or retainer 3 which may be in the form of a cage having a plurality of substantially radial openings therein for receiving the balls 4 is disposed between the inner and outer joint elements and guides and controls the balls in the grooves. The ball retainer 3 has an opening for each two balls 4 as may be seen in FIG. 2.

The inner joint element 2 has a drive or torque transmitting shaft 9 extending therefrom and the shaft 9 and inner joint element 2 are of an integral one-piece construction. The shaft 9 is preferably provided with a non-circular cross section so as to facilitate a torque transmitting connection to a further element.

The outer joint element 1 is provided with a pair of opposed notches or recesses 5 located between a pair of grooves 7. The width in the transverse direction of the notch is at least as great as the diameter of the shaft 9 so as to facilitate assembly of the joint.

The center line of a groove 8 in the inner joint element 2 consists of an arc of a circle "$b$" and a straight line "$g$" as shown in FIG. 1. This center line is positioned in a plane such as "$e_1$" which is spaced from the center longitudinal axis "O" of the joint and is parallel thereto. The center line of groove 8 may also comprise an arc of a circle having a center at "M" or "N".

The center lines of grooves 7 of the outer joint element 1 are positioned in mirror relationship to the center lines of the grooves 8. The center lines of the grooves 7 and 8 for each of the balls 4I and 4J or 4K and 4L are positioned in a plane "$e_1$" or "$e_2$" as shown in FIG. 2 with each plane being spaced a distance "$c$" with respect to a plane "$m$" passing through the longitudinal central axis of the joint. Thus, adjacent center lines of grooves are positioned in the same plane.

Torque is transmitted between the outer joint element 1 and the inner joint element 2 by means of the balls 4. As a result of the shapes of the grooves 7 and 8 as disclosed herein, the balls 4 are guided into a plane which bisects the angle of bending between the inner and outer joint elements.

Figure 3:
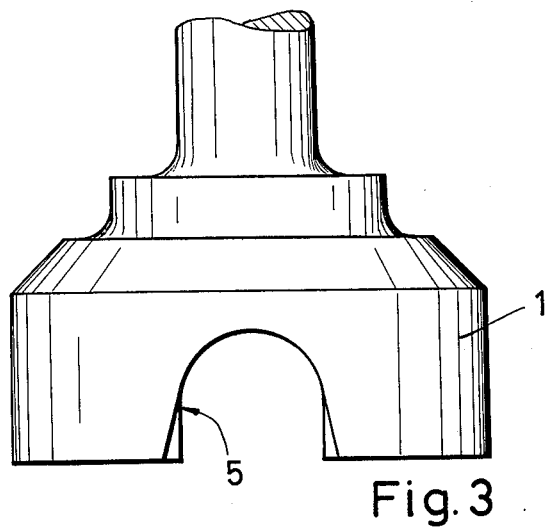
FIG. 3 is an elevational view of the outer joint element showing the recesses therein.

The recesses 5 shown in FIG. 3 may be enclosed by a cover cap, not shown in the drawings, which may also be used for attaching a bellows flexible cover over the joint in a manner known in the art. During assembly of the joint, the inner joint element shaft 5 is positioned at an angle of 90° and inserted into a recess 5 so that the balls 4 can thus be inserted into the openings of the ball retainer 3. Depending upon the structure of the ball retainer, two balls can also be inserted into a common opening of the ball retainer.

The recesses 5 facilitate the forming of the ball grooves 7 since a shaft equipped with two side milling cutters can be inserted into a recess 5 and all of the ball grooves 7 can be formed with a single positioning or clamping of the tool.

Figure 4:
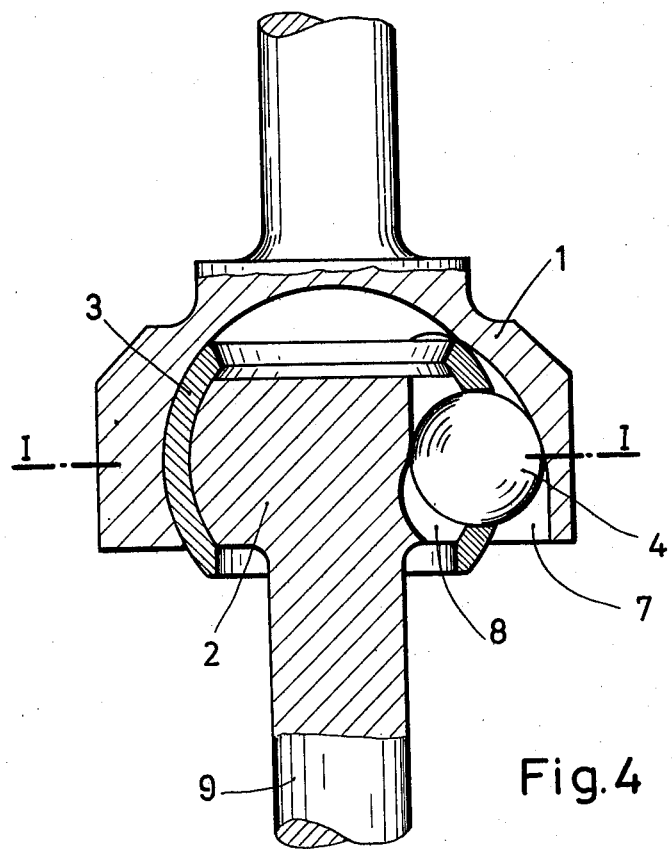
FIG. 4 is a sectional view taken along the line II—II of FIG. 2.

The integral construction of the inner joint element 2 and the shaft 9 and the relationship of the grooves 7 in the spherical cavity of the outer joint element 1 are clearly shown in FIG. 4.

Figure 5:
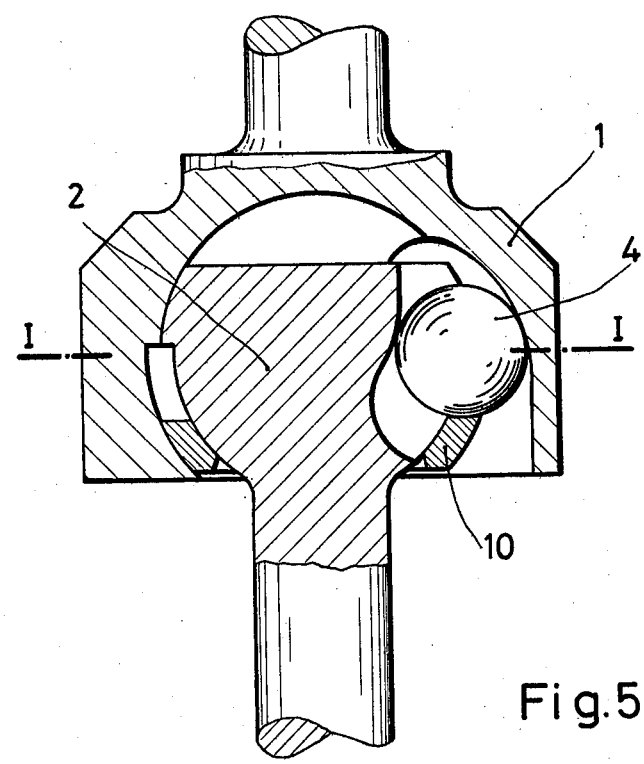
FIG. 5 is a sectional view taken along the line II—II of FIG. 2 and showing an annular ball retainer; and, FIG. 6 is a sectional view taken along the line II—II of FIG. 2 and showing another form of ball retainer.

The universal joint in FIG. 5 has a modified ball retainer in that the ball retainer comprises a single ring 6. After assembly of the joint, the ring 6 is fixed against axial displacement and will prevent the balls 4 from falling out of the joint. The joint does not require any structure securing against axial displacement since a ring 10 is so positioned between the inner joint element 2 and outer joint element 1 that an axial displacement between the joint elements is not possible.

Figure 6:
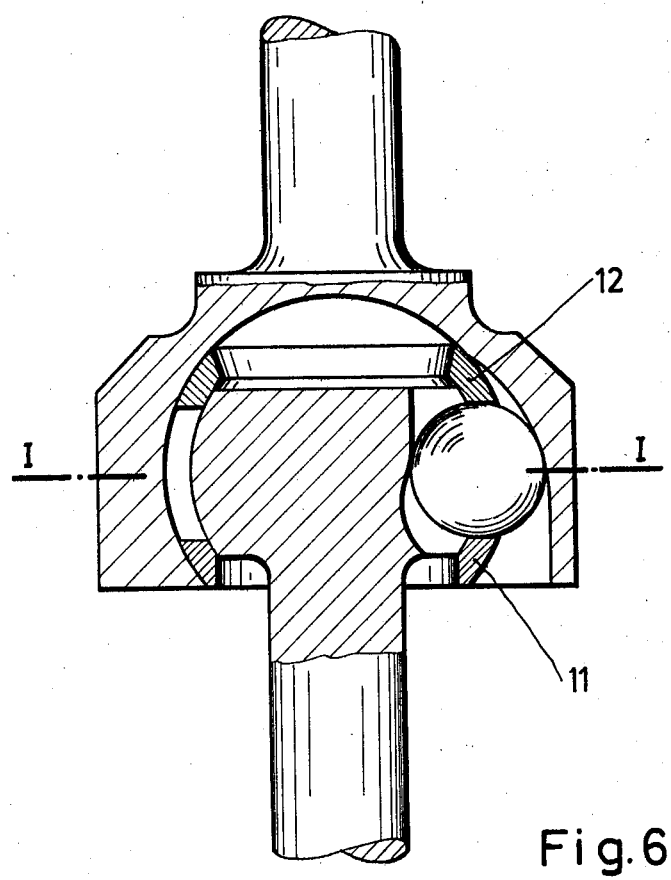

In the universal joint of FIG. 6, the ball retainer comprises spaced rings 11 and 12 positioned on both sides of the balls 4 as shown. The positioning of the rings 11 and 12 is such that the joint elements are prevented from axial displacement with respect to each other.

The ball retainer according to the present invention may therefore comprise at least one annular ring. The ball retainer has a uniform wall thickness and is assembled together with the inner joint element two and is secured automatically between the inner and outer joint members without any additional structure. Additional structure for securing the ball retainer against axial displacement is therefore not necessary even when the ball retainer consists of a single ring.

By providing that the center lines of two adjacent grooves are in the same plane, all of the grooves can be formed in a single manufacturing operation. Costs of manufacturing are thus reduced. Since only a single setting of the tool is necessary, the grooves can be more precisely and accurately positioned with respect to each other.

Thus it can be seen that the present invention has disclosed a constant velocity universal joint having a ball groove structure which significantly facilitates the manufacture of an assembly of the joint elements.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint element having a bore with a spherical surface and a plurality of grooves in said bore surface, an inner joint element within said bore having a spherical outer surface and having a plurality of grooves in said outer surface corresponding in number to said outer joint element grooves to define pairs of opposed grooves, a plurality of balls between said joint elements with each ball being in a pair of opposed grooves, means between said joint elements for retaining said balls in a plane which bisects the angle between the joint elements, said ball retaining means having a first spherical surface on its outer face and a second spherical surface on its inner face, said bore spherical surface of said outer joint element coacting with said ball retaining means first spherical surface and said inner joint element spherical outer surface coacting with said ball retaining means second spherical surface, the number of grooves in each joint element being divisible by two but being at least four, the center line of each groove lying in a plane spaced from the axis of rotation of the joint element and parallel thereto.

2. A constant velocity universal joint as claimed in claim 1 wherein the center lines of two adjacent grooves in a joint element lie in the same plane.

3. A constant velocity universal joint as claimed in claim 1 wherein said inner joint element has an integral shaft extending therefrom.

4. A constant velocity joint as claimed in claim 1 wherein said outer joint element has a recess therein between two ball grooves thereof.

5. A constant velocity universal joint as claimed in claim 3 wherein said outer joint element has a recess between two ball grooves therein, said recess having a width at least as large as the diameter of said inner joint element shaft.

6. A constant velocity universal joint as claimed in claim 1 wherein said ball retaining means comprises at least one ring.

* * * * *